(No Model.)
C. G. COLLINS.
METHOD OF AMALGAMATING GOLD AND SILVER WITH MERCURY.
No. 551,201. Patented Dec. 10, 1895.
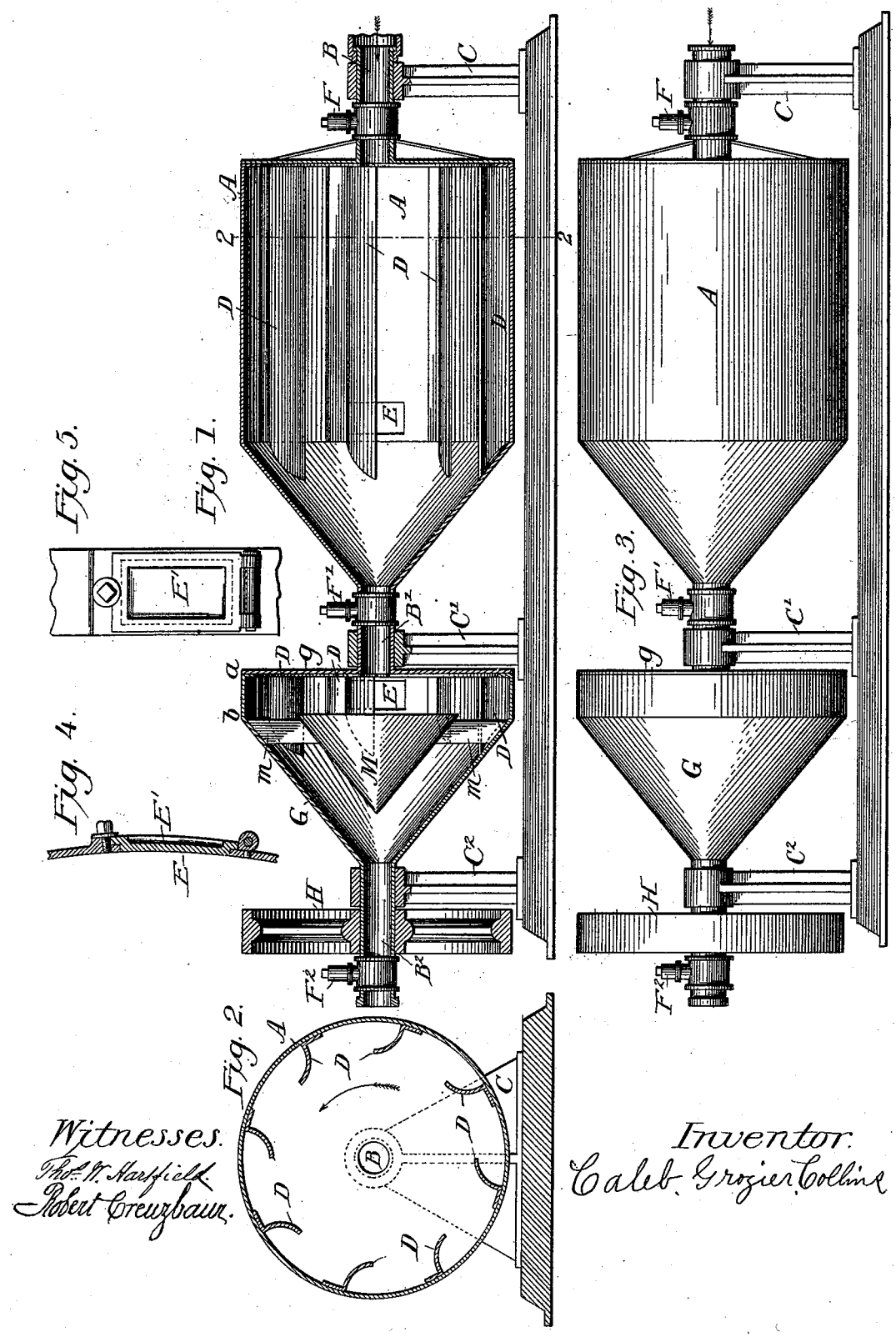
Witnesses.
Thos. W. Harfield.
Robert Creuzbaur.
Inventor.
Caleb Grozier Collins

UNITED STATES PATENT OFFICE.

CALEB GROZIER COLLINS, OF WOODSBURG, NEW YORK.

METHOD OF AMALGAMATING GOLD AND SILVER WITH MERCURY.

SPECIFICATION forming part of Letters Patent No. 551,201, dated December 10, 1895.

Application filed February 21, 1895. Serial No. 539,306. (No specimens.)

*To all whom it may concern:*

Be it known that I, CALEB GROZIER COLLINS, a citizen of the United States, residing at Woodsburg, in the county of Queens and State of New York, have invented certain new and useful Improvements in Methods of Amalgamating Gold and Silver with Mercury, of which the following is a full, clear, and exact description, reference being had to the accompanying drawings, which form a part of this specification, in which—

Figure 1 is a central longitudinal section partly in elevation; Fig. 2, a cross-section along the line 2 2, Fig. 1; Fig. 3, an elevation, and Figs. 4 and 5 a longitudinal section and a plan of the hand-holes and their covers.

My invention relates to a method or process of and apparatus for extracting gold or silver or both from their ores or material in which they may be mixed by means of amalgamation with mercury and of concentrating the parts of such metals which do not amalgamate, and particularly to the use of sodium phosphate for the purpose of preventing the mercury from atomizing or flouring during the treatment of the ore-pulp. In carrying out my invention I can use any suitable machine or vessel. A preferred form of such a vessel is represented by said figures, in which similar letters refer to similar parts throughout the several views.

A is a cylindrical vessel, preferably square ended at one end and coned at the other end, as shown, with a central hollow trunnion B B' at each end, which serve for inlet and outlet of water or other materials used, as well as for supports upon bearings C C', wherein the trunnions B B' are adapted to rotate.

D D are buckets fixedly attached to the circumference or shell of vessel A, adapted to carry the contents of the vessel at its lower side upwardly and to discharge them at a higher level.

E is a hand-hole upon the periphery of vessel A, through which it may be charged and its contents controlled and reached. This hand-hole is provided with a cover E', as shown in Figs. 4 and 5.

F and F' are valves upon the trunnions, preferably "Ludlow" or "straightway" valves. Both trunnion ends of vessel A are arranged to be attached each to a pipe or hose by means of couplings adapted to remain stationary with the pipe or hose, while the trunnions B and B' revolve within the coupling. This vessel A with its appendages may be used alone, as hereinafter described, but a superior result is obtained by using it in conjunction with the auxiliary vessel G, which is cylindrical from $a$ to $b$, square ended next to vessel A, and cone-shaped at the opposite end, as shown. It is also provided with buckets D D, fixedly attached to its outer shell, and serving the purpose described with reference to buckets D in vessel A. When such vessel G is used in conjunction with vessel A, the end of the trunnion B', instead of being formed to revolve within a coupling, as aforesaid, is flanged and fixedly attached to the end disk $g$ of vessel G, which disk has a central opening corresponding to the opening in trunnion B'. A hand-hole E" is formed in the cylindrical shell of vessel G, provided with a cover, as represented in Figs. 4 and 5. The coned end of vessel G ends in a hollow trunnion $B^2$, supported upon another bearing $C^2$, within which it is adapted to revolve, another valve $F^2$ being incorporated in and upon said trunnion $B^2$. A power-transmitting hand-wheel H is mounted upon and keyed to trunnion $B^2$, as shown, whereby both vessels G and A with their trunnions may be revolved. If the discharge is to be distant from trunnion $B^2$, its outer end is also adapted to revolve within a stationary coupling. Within vessel G a hollow cone M is fixedly attached to the outside shell of vessel G by transverse ribs $m$. The object of this auxiliary vessel G will appear from the following description of the operation of the mechanism described.

The process of using my improved method of saving substantially all the mercury used in amalgamating gold and silver, and of causing the remaining sulphurets to be concentrated by the mechanism described, is as follows: The ore may be mixed with water to form a freely-flowing pulp before the vessel A is charged with the same, or the ore may be put dry into the vessel, and water added as required, charging the vessel about two-thirds full. From one-half to one and one-half pounds of mercury per hundred weight of ore are added to the charge in the vessel A, whereupon the latter is revolved by means of band-wheel H at not over thirty-five revolutions per minute, the vessel being forty inches in diameter, or at a speed considerably less than that which, by centrifugal force, would retain the material against the outer shell of the vessel, preventing its due admixture and the desired concentration. After the mercury is thus thoroughly mixed with the pulp and has become more or less floured or atomized, I add sodium phosphate to the amount in weight of about one-twentieth the weight of mercury used, the necessary amount varying according to the nature of the ore. The effect of this admixture with the mercury causes the latter to concentrate and collect into beads and finally into one mass; or if it is mixed with the mercury before the latter is is added to the charge in the vessel A it will prevent the mercury from flouring; or the said sodium phosphate may be admixed with the ore directly in proper quantity. When to be used for hydraulic mining, the mercury is put into a vessel containing a solution of said sodium phosphate, of which the mercury will absorb the necessary quantity to keep it from atomizing or flouring. The vessels A and G having been revolved a sufficient length of time to amalgamate the mercury and the gold or silver, the speed of the machine is slowed down, the valves F F' F$^2$ are opened, and a small amount of water is allowed to flow through the machine, entering it through trunnion B, the water leaving the machine through trunnion B if vessel G is not used, or through the trunnion B$^2$ when vessel G is used. After the lighter particles are thus carried out, a stronger flow of water is passed through the machine while revolved with greater speed, until all the lighter parts of the ore-pulp are discharged as described. The vessel G being part of the mechanism as represented, the overflow from vessel A is discharged through trunnion B' into vessel G, wherein particles of sulphuret of gold and silver contained in the overflow may be entrapped and concentrated, the cone M guiding the overflow pulp and water toward the buckets D, from whence it passes in subdivided form over the oblique surface of the cone M toward the outlet through trunnion B$^2$. During this circuitous route and thorough mixing of the materials by the action of the buckets D and cone M a further concentration of the saving of the precious metals is achieved. The machine is then stopped, and the concentrates and mercury are removed through the hand-hole E E'.

What I claim, and desire to secure by Letters Patent, is—

The herein described process of treating the mercury used in amalgamating gold and silver, consisting in mixing it with sodium phosphate to prevent waste and making it more receptive to gold and silver.

CALEB GROZIER COLLINS.

Witnesses:
ROBERT CREUZBAUR,
R. WALTER CREUZBAUR.